United States Patent [19]

Wolfe

[11] Patent Number: 4,933,384
[45] Date of Patent: Jun. 12, 1990

[54] BITUMINOUS MATERIALS

[75] Inventor: David L. Wolfe, Midland, Mich.

[73] Assignee: The Dow Chemical Company, Midland, Mich.

[21] Appl. No.: 817,659

[22] Filed: Jan. 10, 1986

[51] Int. Cl.$^5$ .................... C08L 31/02; C08L 23/06
[52] U.S. Cl. ............................. 524/69; 524/70; 524/71
[58] Field of Search ............... 524/69, 59, 70, 71

[56] References Cited

U.S. PATENT DOCUMENTS

| | | |
|---|---|---|
| 2,871,212 | 1/1959 | Thayer . |
| 3,312,649 | 4/1967 | Pitchford et al. . |
| 3,317,447 | 5/1967 | Black et al. . |
| 3,329,636 | 7/1967 | Henschel . |
| 3,336,252 | 8/1967 | Raichle et al. .................... 524/70 |
| 3,364,168 | 1/1968 | Gessler et al. . |
| 3,414,533 | 12/1968 | Treischmann et al. ............ 524/69 |
| 3,442,841 | 5/1969 | Adelman .......................... 524/69 |
| 3,484,507 | 12/1969 | Smith . |
| 3,531,426 | 9/1970 | Wenonah et al. ................. 524/69 |
| 3,634,293 | 1/1972 | Bonitz ............................. 524/69 |
| 3,853,800 | 12/1974 | Haberl . |
| 3,978,014 | 8/1976 | van Beem et al. . |
| 3,980,598 | 9/1976 | Moorwessel et al. ............. 524/69 |
| 4,105,612 | 8/1978 | Cushman et al. ................. 524/69 |
| 4,172,061 | 10/1979 | Bresson . |
| 4,240,946 | 12/1980 | Hemersam . |
| 4,282,127 | 8/1981 | Desgouilles . |
| 4,314,921 | 2/1982 | Biegenzein . |
| 4,332,703 | 6/1982 | Lijzenga et al. . |
| 4,419,469 | 12/1983 | Bohm et al. . |
| 4,454,269 | 6/1984 | Goodrich . |
| 4,511,689 | 4/1985 | Aldred .............................. 524/69 |

FOREIGN PATENT DOCUMENTS

| | | |
|---|---|---|
| 1201135 | 8/1970 | United Kingdom . |
| 2038848 | 7/1980 | United Kingdom . |

OTHER PUBLICATIONS

Kraus, Gerard–Modification of Asphalt by Block Polymers of Butadiene and Styrene; Rubber Chemistry and Technology, vol. 55, presented May 1982, (pp. 1389–1402).

Shell Technical Bulletin, Shell Chemical Company SC:57-75, Mar. 1975.

*Primary Examiner*—Lewis T. Jacobs
*Attorney, Agent, or Firm*—Bruce M. Kanuch

[57] ABSTRACT

A composition useful as a pavement material comprising a mixture of asphalt and a polymer of an $\alpha$-olefin, or an interpolymer of an $\alpha$-olefin, and at least one copolymer selected from the group consisting of an $\alpha,\beta$-unsaturated carboxylic acid, a monomer of an $\alpha,\beta$-unsaturated carboxylic acid, a vinyl ester of alkanoic acid, and carbon monoxide.

5 Claims, No Drawings

BITUMINOUS MATERIALS

BACKGROUND

The use of petroleum residuum such as asphalt as a paving material and other construction material is well known. It is also well known to blend various polymeric materials into the asphalt to improve certain properties. For example, polyolefins have been used; but, as pointed out in U.S. Pat. No. 4,240,946 the teachings of which are specifically incorporated herein by reference, the addition of such polyolefins increases the viscosity of such blends at working temperatures thus necessitating special mixing and homogenizing procedures. The use of such polyolefins, however, is greatly desired since they help maintain the integrity of the asphalt when subjected to elevated temperatures such as when used as pavement material. It would be helpful if a polyolefin material were discovered which could be easily blended with the asphalt at normal working temperatures such as from about 270° F. to about 340° F. without significantly increasing the viscosity of the mixture above the normal level while imparting improved stability at environmental temperatures. The present invention concerns such a discovery.

SUMMARY OF THE INVENTION

The present invention comprises a bituminous binder blended with an olefin homopolymer and/or an interpolymer of an α-olefin and at least one comonomer which renders the olefin more polar. Olefin homopolymers include polymers of a single olefin such as ethylene, as well as interpolymers of more than one α-olefin such as ethylene-butylene, ethylene octylene and the like. The comonomer can be selected from the group consisting of an α,β-ethylenically unsaturated carboxylic acid, or the neutralized metallic salts thereof (known in the art as ionomers); vinyl esters of alkanoic acids; carbon monoxide and various interpolymers containing one or more of the aforementioned comonomers and blends of two or more such interpolymers. The polymers have a sharp melting point which is higher than the normal temperature to which the asphalt is subjected to in use (e.g., pavement under summer conditions) and less than the temperature employed in applying the asphalt material. A melting point of between about 140° F. (60° C.) and about 350° F. (176.7° C.) is useful. The polymers also are characterized by having a melt flow index (determined by ASTM D-1238-Sch.E) ranging from about 50 g/10 min to about 3000 g/10 min, preferably 100 g/10 min to about 3000 g/10 min. The ratio of polar monomer to olefin monomer in the interpolymer is within a range that the interpolymer remains compatible (dispersible) with the asphalt material and does not separate from the blend.

DETAILED DESCRIPTION OF THE INVENTION

The bituminous material employed in the practice of the present invention is not critical. Any bitumen, asphalt or crude residuum containing asphaltenes can be employed. U.S. Pat. No. 3,317,447 contains a good description of useful bituminous materials and the teachings of this patent are specifically incorporated herein by reference. In general, the asphalts which can be employed include conventional petroleum asphalts, natural asphalts, gilsonite, air blown asphalts, coal tar and other similar materials. The asphalts are characterized by having penetration grades of up to 300 as measured by ASTM Method D5. Preferred asphalts are the normal paving asphalts (e.g. AC5, AC10, AC20, and AC30. AC indicates asphalt cement and the number indicates viscosity at 140° F. in poise divided by 1000).

The homopolymers employed in the practice of the invention are selected from low density, medium density and linear low density and high density polyolefins having a melting point and melt flow index as set forth herein. Polyethylene and polyethylene polymers containing an additional α-olefin ($C_3$–$C_8$) are preferred polymers.

The interpolymers useful in the practice of the invention are prepared from the reaction of an α-olefin and a comonomer which adds polar characteristics to the olefin. The olefin preferably is a $C_1$ to $C_7$ alpha olefin. Ethylene is preferred. The comonomer is a material which adds polar characteristics to the α-olefin and is selected from the group consisting of α,β-ethylenically unsaturated carboxylic acids, ionomers, esters of such acids, carbon monoxide and interpolymers containing two or more of such comonomers and blends of two or more such interpolymers. The comonomers are employed in an amount which provides an interpolymer which has a sharp melting point between about 140° F. (60° C.) and about 350° F. (176.7° C.) the normal working temperature used in preparing the bituminuous material for use as paving material, roofing material or the like. The interpolymer should have a Melt Flow Index (determined by ASTM D 1238-Sch.E) ranging from about 50 g/10 min to about 3000 g/10 min or higher, (preferably about 100 to about 3000). The mole percent of comonomer in the interpolymer can range over a wide span. The amount will depend on the particular comonomer employed. However, the maximum amount will be such that the interpolymer does not become incompatable with the bituminous material and tend to separate therefrom. This can be readily ascertained by simple laboratory testing prior to formulating the blend for use as a paving material or the like. The interpolymer preferably has a melt index and percentage of copolymers which will cause the interpolymer to form a homogenous blend with the asphalt at a temperature of between about 200° F. (93° C.) and 300° F. (149° C.). Preferred copolymers are CO/ethylene copolymer containing, as percent by weight from about 1 to about 30 percent CO, preferably from about 1 to about 10 percent CO. Other preferred copolymers contain ethylene and acrylic and/or methacrylic acid in an amount ranging from about 1 to about 30 percent, preferably 1 to about 25 percent of acrylic and/or methacrylic acid.

Specific examples of comonomers which can be employed include, for example, acrylic acid, methacrylic acid, crotonic acid, vinyl acetate, vinyl butyrate, lower alkyl or hydroxyalkyl ($C_1$ to about $C_8$) esters of the aforementioned ethylenically unsaturated carboxylic acids (e.g. methyl acrylate, ethyl acrylate, hydroxyethyl acrylate, n-butyl acrylate, methyl methacrylate, ethyl methacrylate, etc.); and the like. Particularly preferred interpolymers are ethylene/acrylic acid polymer containing about 3 percent by weight of acrylic acid and having a melt flow index of about 2600 g/10 min; ethylene/acrylic acid containing about 8 percent by weight acrylic acid and having a melt flow index of about 600; and an ethylene/CO polymer containing about 8 percent by weight of CO and having a melt flow index of about 250. These polymers are well known in the art as well as their method of manufacture. U.S. Patents 4,351,931; 3,520,861; 4,252,924; and 3,969,434 describe such polymers and their method of manufacture. The teachings of these patents are specifically incorporated herein by reference.

Interpolymers of an α-olefin (e.g., ethylene) and carbon monoxide are well known. Specific interpolymers of an α-olefin and carbon monoxide (CO) with or without additional polar comonomers include, olefin polymers which have carbon monoxide groups incorporated into the polymer chain. A sole olefin or a plurality of olefins may be used along with the carbon monoxide in preparing the polymers. Preferably the olefin monomer is ethylene (sometimes including a small proportion of a $C_3$–$C_8$ aliphatic olefin for property modification). The olefin monomer can also include an unsaturated organic acid having about 3 to about 8 carbon atoms, such as acrylic acid, methacrylic acid, 1-buteneic acid, and the like; alkyl ester or metal salts of these acids may also be used, such as ethyl acrylate, methyl methacrylate, 2-ethyl hexyl acrylate, sodium acrylate, potassium methacrylate, and the like. Hydrogenated CO containing olefin polymers (hydrogenation creates C-OH groups along the polymer chain) are included here, such as hydrogenated ethylene/carbon monoxide copolymers. U.S. Pat No. 2,495,292 discloses methods of hydrogenating such CO groups in a polymers chain. The teachings of this patent are specifically incorporated herein by reference.

It has been known for many years that olefins, e.g. ethylene, and carbon monoxide, can be copolymerized or terpolymerized. The following listed patents are believed to be representative of the art pertaining to interpolymers of carbon monoxide and monoolefins: U.S. Pat. No. 2,495,292; U.S. Pat. No. 2,495,286; U.S. Pat. No. 2,497,323; U.S. Pat. No. 2,641,590; U.S. Pat. No. 3,083,184; U.S. Pat. No. 3,248,359; U.S. Pat. No. 3,530,109; U.S. Pat. No. 3,676,401; U.S. Pat. No. 3,689,460; U.S. Pat. No. 3,694,412; U.S. Pat. No. 3,780,140; U.S. Pat. No. 3,835,123; U.S. Pat. No. 3,929,727; U.S. Pat. No. 3,948,832; U.S. Pat. No. 3,948,873; U.S. Pat. No. 3,948,850; U.S. Pat. No. 3,968,082; U.S. Pat. No. 3,984,388; U.S. Pat. No. 4,024,104; U.S. Pat. No. 4,024,325; U.S. Pat. No. 4,024,326; U.S. Pat. No. 4,139,522; U.S. Pat. No. 4,143,096; and U.S. Pat. No. 4,304,887. The teachings of these patents are specifically incorporated herein by reference.

The amount of polymer to be used in the asphalt blend can range from about 1 to about 50 percent by weight, preferably from about 3 to about 20 percent by weight of polymer is employed.

The polymer is admixed with the bituminuous material in any convenient manner employing the equipment which is normally used in paving, roofing and other construction projects. The bituminuous material and the polymer are hot mixed at a temperature of from at least about 140° F. (60° C.) up to the decomposition temperature of the polymer. The polymeric material component as finely divided solid or in solution, in a solvent e.g. with benzene or toluene, is mixed into molten asphalt. Other additives can be mixed with the blend such as fillers, e.g. sand, gravel and other aggregates normally employed in such material. High stearing equipment is not required. The resultant material when used has improved stability under use conditions, has improved antistrip properties and is more resistant to hydrocarbon solvents such as gasoline and the like.

EXAMPLE 1

Solutions containing 5 percent and 10 percent by weight of certain interpolymers in an asphalt were prepared. The asphalt consisted of Marathon 85 to 100 penetration graded material.

Three hundred grams of the asphalt were mixed with 30 and 15 grams, respectively, of certain interpolymers at 250° F. (121.1° C.) until completely dissolved. Viscosity measurements were made on each mixture at 275° F. (135° C.). Viscosity measurements were made employing ASTM D-2170 standard test conditions.

Penetration tests were also run on the samples at 77° F. (25° C.). These tests were conducted employing ASTM D-5 standard test conditions.

The results of these tests are set forth in the following Table I.

TABLE I

| Test No. | Interpolymer Composition[1] | Polyolefin Melt Flow Index[2] | % wt. Conc. in Asphalt | Penetration at 77° F. (25° C.) (decimillimeter) | Viscosity at 140° F. (60° C.) (poises) | Viscosity at 275° F. (135° C.) (poises) |
|---|---|---|---|---|---|---|
| 1 | 8% acrylic acid/92% ethylene | 2600 g/10 min | 5 | 63 | 1837 | 4.6 |
|   |   |   | 10 | 50 | 3146 | 8.0 |
| 2 | 20% acrylic acid/80% ethylene | 200 g/10 min | 5 | 35 | 1362 | 4.1 |
|   |   |   | 10 | 33 | 2133 | 5.0 |
| 3 | 3% acrylic acid/97% ethylene | 11 g/10 min | 5 | 30 | 4076 | 8.7 |
|   |   |   | 10 | 27 | 10729 | 22.9 |

[1]By weight (%)
[2]Melt flow index determined by D-1238-Sch.E ASTM

EXAMPLE 2

An asphalt sample was prepared as in the previous example containing 10 percent by weight of an interpolymer of ethylene and a comonomer set forth in the Table II and having a melt flow index as shown. Biscuit shaped samples were prepared using Hveem Compaction (described in ASTM test method D-1561). Resilient modulus (Mr) were determined on samples at different temperatures. Resilient modulus was determined on a Mark V resilient modulus apparatus (Retsina Co.). The results of these tests are set forth in the following Table II.

TABLE II

| Test No. | Interpolymer Composition | Melt Index | % weight conc. in Asphalt | Temperature (°F. °C.) | MR. psi |
|---|---|---|---|---|---|
| 1 | 20% Acrylic Acid 80% ethylene | 200 | 10 | 34° F. (1.1° C.) 77° F. (25° C.) 104° F. (40° C.) | 2.83 × 10$^6$ 448,400 100,100 |
| 2 | 8% (1) CO 92% ethylene | 249 | 10 | 34° F. (1.1° C.) 77° F. (25° C.) 104° F. (40° C.) | 2.27 × 10$^6$ 525,800 139,400 |
| 3 | 7.5 CO 92.5 ethylene | 110 | 10 | 34° F. (1.1° C.) 77° F. (25° C.) 104° F. (40° C.) | 2.94 × 10$^6$ 598,300 168,600 |
| 4 | 3% Acrylic Acid 97% ethylene | 600 | 10 | 34° F. (1.1° C.) 77° F. (25° C.) 104° F. (40° C.) | 3.39 × 10$^6$ 690,800 184,500 |
| 5 | 8% Acrylic Acid 92% ethylene | 700 | 10 | 34° F. (1.1° C.) 77° F. (25° C.) 104° F. (40° C.) | 2.37 × 10$^6$ 627,700 122,500 |
| 6 | 8% Acrylic Acid 92% ethylene | 2600 | 10 | 34° F. (1.1° C.) 77° F. (25° C.) 104° F. (40° C.) | 3.31 × 10$^6$ 617,490 175,200 |
| 7 | 20% Acrylic Acid 80% ethylene | 500 | 10 | 34° F. (1.1° C.) 77° F. (25° C.) 104° F. (40° C.) | 2.33 × 10$^6$ 634,200 99,900 |

(1) Carbon Monoxide

EXAMPLE 3

In another series of tests, viscosity and penetration tests were performed on various asphalt blends, comparing data with aged and unaged samples. In each sample, a blend of a polymer (10by weight) and asphalt (in Marathon 85-100 penetration graded asphalt cement) was prepared. Part of the sample was then aged in a rolling thin film oven. Viscosity measurements were made at a temperature of 275° F. (135° C.) and penetration tests at 39° F. (4° C.). The tests were performed using ASTM-D-2170 for viscosity and ASTM-D-5 for penetration (4° C., load 200 g, time 60 sec.). The results of these tests are set forth in the following Table III.

TABLE III

| Test No. | Melt Index | Interpolymer Compositions | Viscosity (centipoise) | Penetration decimillimeters |
|---|---|---|---|---|
| 1 | 500 | 20% Acrylic Acid/80% ethylene | 533 | 30.25 |
| 1 (aged) | 500 | | 1890 | 14.50 |
| 2 | 700 | 8% Acrylic Acid 92% ethylene | 850 | 24.75 |
| 2 (aged) | 700 | | 2007 | 14.00 |
| 3 | 2600 | 8% Acrylic Acid 92% ethylene | 820 | 26.00 |
| 3 (aged) | 2600 | | 5820 | 13.00 |
| 4 | 600 | 3% Acrylic Acid 97% ethylene | 1740 | 24.25 |
| 4 (aged) | 600 | | 7030 | 18.75 |
| 5 | 2600 | 19% Acrylic Acid 81% ethylene | 490 | 30.75 |
| 5 (aged) | 2600 | | 8890 | 14.25 |

EXAMPLE 4

In this series of tests the temperature at which 10 percent by weight of a polymer went totally into solution in an asphalt was determined by visually observing when a homogeneous blend was produced. The compositions and melt flow indexes of the interpolymers in Table IV correspond to the compositions and melt flow indexes of the same test numbers set forth in Table II.

TABLE IV

| Test No. | Temperature °F. (°C.) |
|---|---|
| 1 | 280° (137.8) |
| 2 | 280° (137.8) |
| 3 | 290° (143.3) |
| 4 | 270° (132.2) |
| 5 | 275° (135.0) |
| 6 | 260° (126.7) |
| 7 | 280° (137.8) |

What is claimed is:

1. A composition which comprises asphalt and blended therewith from about 1 to about 50 percent by weight of an olefinic polymer selected from the group consisting of homopolymers of an α-olefin and interpolymers of an α-olefin and at least one comonomer selected from the group consisting of α,β-unsaturated carboxylic acid, and vinyl ester of alkenoic acid and a mixture thereof, wherein said polymer has a melting point between about 140° F. and about 350° F. and a melt index of greater than 200, and is dispersible in said asphalt.

2. The composition of claim 1, wherein the interpolymer is a copolymer of ethylene and an α,β-unsaturated carboxylic acid.

3. The composition of claim 1, wherein the olefinic polymer is a homopolymer of ethylene.

4. The composition of claim 1, wherein the olefinic polymer is an interpolymer of ethylene and at least one of acrylic acid and methacrylic acid wherein said acid in said polymer ranges from about 1 to about 30 percent by weight.

5. The composition of claim 1 wherein the composition includes a filler.

* * * * *